May 1, 1956      R. M. GODDARD      2,743,543
ORNAMENTAL ATTACHMENTS FOR EYEGLASS FRAMES
Filed Oct. 5, 1954
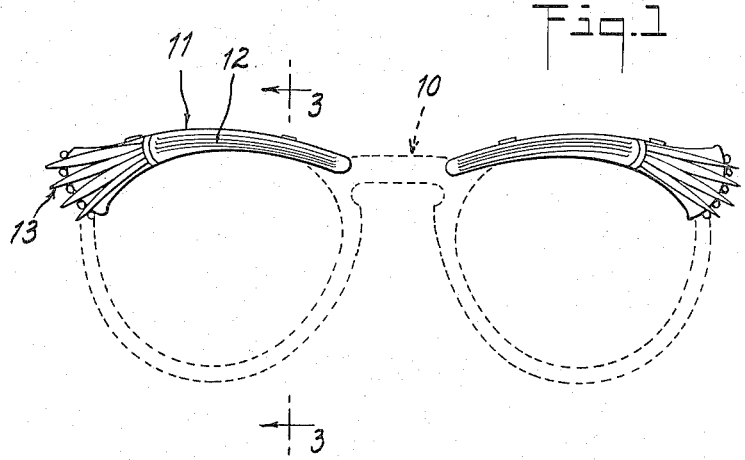
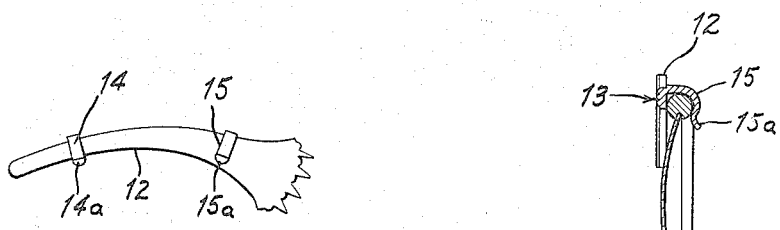
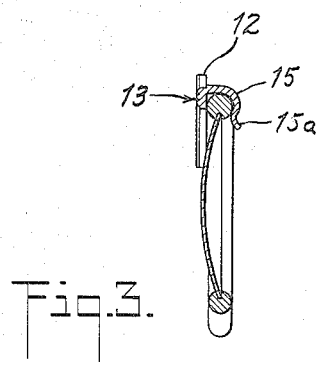
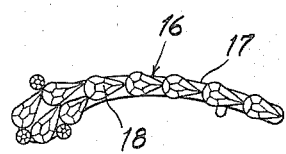
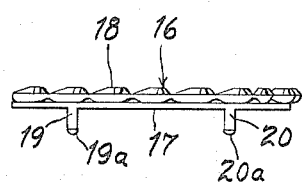
INVENTOR.
RUTH M. GODDARD
ATTORNEY

United States Patent Office 2,743,543
Patented May 1, 1956

2,743,543

ORNAMENTAL ATTACHMENTS FOR EYEGLASS FRAMES

Ruth M. Goddard, New York, N. Y., assignor to Milton E. Brown & Co., New York, N. Y.

Application October 5, 1954, Serial No. 460,383

1 Claim. (Cl. 41—10)

This invention relates, generally, to articles that are intended for use in personal adornment, and, more particularly, it relates to certain novel, ornamented articles that may be so utilized by wearers of eyeglasses.

Recently, certain types of eyeglass frames, formed of molded or otherwise shaped plastic materials and intended for women's use, have been provided with various forms of ornament, especially in those portions of the frames whereat the temple pieces are attached, by hinge or equivalent elements, to the nosepieces that carry and support the lenses in the lines of vision of the users. Among the forms of ornament that have been so utilized are mock or imitated gems, bits and pieces of glass, plastics or other glistening, light-refrangible substances that can be imbedded at least partially, during manufacture of the frames, in the still-plastic material from which the elements of the frames are formed. In this manner, the selected ornamental materials are retained at least partially within the body of the plastic mass constituting the frames, although sufficiently exposed that their ornamental properties may be utilized.

This mode of ornamenting eyeglass frames formed of plastic materials has several very important disadvantages, whether regarded from the viewpoint of the manufacturer of the frames or of the user of the frames. For instance, the positioning of the ornaments in the mold in which the plastic material is to be shaped must be very carefully effected, usually by a time-consuming hand operation requiring semi-skilled and, hence, expensive labor, and precautions must be taken to avoid shifting of the ornaments within the mold when the plastic molding composition is introduced into the mold. If the ornamental frames are made by setting the ornaments in the otherwise finished frames, as by partially softening the plastic material and then embedding the ornament therein so that it will occupy the desired position when the plastic hardens, distortion of the frames occurs in many instances, even when highly skilled and very costly labor is employed in the operation, thus a substantial proportion of the processed frames, when subjected to final inspection, must be rejected. Moreover, the mere presence of these foreign ornamental bodies within the plastic mass constituting the frames results inevitably in a material structural weakening of the frames with the result that fracturing of the frames occurs more readily than it would in unornamented frames, particularly when the frames are softened to facilitate setting of the eye lenses, or when exposed to suddenly varied ambient temperatures.

From the viewpoint of the users of the thus ornamented eyeglasses, a disadvantage, perhaps the chief disadvantage, of this mode of ornamenting eyeglass frames is the fact that it necessitates purchase of a multiplicity of complete eyeglasses, unornamented for ordinary or business use, ornamented for wear and use on social occasions, including, indeed, a whole series of variously ornamented eyeglasses suited for harmonious use with suitably ornamented articles of personal apparel.

An object of the present invention is to provide means for ornamenting eyeglass frames that eliminates the necessity for the user having a plurality of sets of eyeglasses in order to enjoy the benefits of using, at choice, either ornamented or unornamented frames.

Another object of this invention is to provide means for the ornamentation of eyeglass frames formed of plastic or similar materials that does not affect adversely the structural integrity and strength of the frames and that does not make them more readily subject to fracture than are unornamented frames made of these materials.

A further object of the instant invention is to provide means for effecting aesthetically satisfying ornamentation of ordinary forms of eyeglass frames, whether shaped of plastic material or made solely from metal or from combinations of plastic material and metal, and which is adapted to be readily attached to or detached from the frames, thereby suiting the users' requirements for ornamentation or its absence.

Other objects of this invention, and the advantages and features possessed by the ornamental attachments for eyeglass frames that embody the principles of this invention, will be apparent hereinafter.

To facilitate a fuller and better understanding of the principles of this invention and how those principles may best be given concrete embodiment, reference is now made to the accompanying drawing forming a part of this application wherein certain presently preferred embodiments of this invention are graphically represented, and wherein:

Figure 1 is a front elevational view of presently preferred embodiment of the ornamental eyeglass frames attachments according to this invention, here shown in position of use upon eyeglass frame represented in broken lines;

Figure 2 is a rear elevational view of one of the ornamental attachments illustrated in Figure 1;

Figure 3 is a sectional view of the subject of Figure 1, taken along the line 3—3 thereof;

Figure 4 is a front elevational view of one of a pair, illustrating a second embodiment of the ornamental eyeglass frames attachments according to this invention; and Figure 5 is a side elevational view of the subject of Figure 4.

Reference is now made to these figures of the drawing, especially Figure 1 thereof, for a detailed description of the ornamental eyeglass frames attachments according to this invention. It will be seen that the eyeglass frame, shown in broken lines and generally indicated by the reference numeral 10, bears a matched pair of ornamental attachments, related to each other as mirror-images, one positioned above each of the eyeglass lenses, one of these attachments being generally indicated by the reference numeral 11. The attachment numbered 11, it will be noticed, overlies that portion of the frames 10 located at the top of the left of the two eyeglass lenses, when viewed as in Figure 1. It will be noticed, further, that not only are the two ornaments related, in appearance, as the mirror-images of each other, but it is to be understood that a like relationship, structurally, exists between the individual ornaments of each matched pair.

It will be observed that the ornamental attachment 11, like its counterpart positioned above the right eyeglass lens, as a whole, is of a generally arcuate configuration, whereby it substantially masks the upper portions of the eyeglass frames to which it is attached, without overlying those portions of the eyeglass lens intercepted normally by the user's line of vision or otherwise, in any way, modifying the full effectiveness, optically, of the eyeglasses during wearing and use. It is to be observed, also, as will be further apparent hereinafter, that the general configuration and disposition of the ornamental attachments relative to the eyeglass frames is such that they do not project outwardly from the frame in a manner such as to preclude use of an ordinary eyeglass case of usual dimensions, such as one suited to receive the eyeglasses when without the ornamental attachments.

Referring now to Figures 2 and 3 of the drawing, in conjunction with Figure 1, it will be noticed that the ornamental attachment generally indicated by the reference numeral 11 is a single structural entity, comprised of an essentially elongate, generally arcuate portion 12, provided with an ornamental facing generally indicated by the reference numeral 13, and having a plurality of integrally formed lugs 14 and 15, extending radially relative to the arcuate portion 12, bent back upon themselves to overlie said portion, substantially as shown. The bent lugs 14 and 15, it will be observed, constitute U-shaped clip elements suited to receive and engage with marginal portions of eyeglass frames for detachably mounting the ornamental attachment thereon as will be described hereinafter in more complete detail. It is to be noticed that the terminal or distal portions of the bent lugs 14 and 15 are provided with reverse bent portions 14a and 15a respectively, which function to assist in retaining the clip elements in engagement when engaged with marginal portions of eyeglass frames lying peripheral to the lens elements as will be described in detail hereinafter.

Referring now particularly to Figures 4 and 5 of the drawing, the second illustrated embodiment of the invention will now be described. It is to be understood that, in these figures, merely one of a pair of ornaments is illustrated, the other ornament of the pair being related in appearance and in structural details, as the mirror-image of the ornament shown. It will be noticed that the ornamental eyeglass frames attachment according to this embodiment of the invention, indicated by the reference character 16, has substantially the same general configuration as the hereinabove described embodiment and comprises a substantially flat, elongate, generally arcuate element 17, having integrally united thereto an ornamental facing layer 18, and being provided with a plurality of radially extending lugs, 19 and 20, integrally formed with said element 17 and bent back to overlie portions of said element, constituting open, U-shaped clips, substantially as shown. The terminal or distal parts of the lugs 19 and 20, it will be observed, are provided with reverse bent portions, 19a and 20a, which function to assist in retaining the clips in engagement when engaged with marginal portions of eyeglass frames lying peripheral to the lens elements as will be hereinafter described.

In this second embodiment of the invention, the ornamental facing layer 18 may be formed integrally with, that is, shaped from the substance of, the arcuate element 17, or it may be a separate element united to the arcuate element by suitable fastening or integrating means, for instance, by welding, soldering, riveting, or other means whereby the union effected is such that the united elements may be regarded, structurally, as being integrated into a single entity. For example, a plurality of precious, semi-precious or non-precious stones or similar ornaments, individually set in metal settings, may be arranged on the metallic element 17 and united thereto and to each other by soldering, whereby a fully integrated structure is produced, having substantially the appearance of the subject of Figures 4 and 5.

The mode of engagement of the above-described ornamental attachments with representative eyeglass frames, particularly frames made of plastic or the like and shaped to have substantially the form illustrated in the figures of the drawing, will now be described. To engage the attachment with the frames, the former is positioned adjacent to the latter in a manner such that the ornamental front element faces toward the direction of vision of the user when wearing the frames and the open ends of the clips face and lie against a marginal portion of the frames lying peripherally to one of the lens elements, either at the upper periphery of the lens when use substantially as illustrated in Figure 1 is contemplated, or at the side periphery, if such a positioning of the ornament is desired. Gentle pressure is applied to force the marginal portion of the frames into the U-shaped clips, whereby the clips are spread slightly as the frames portion is forced into place, then spring into a relationship to the frames, substantially as illustrated in Figure 3, with the reverse bent end portions of the clips engaged with the frames substantially in the manner shown in the drawing.

It is to be understood that the articles according to this invention are fabricated of materials so selected that, in every instance, the clip portions of the articles are made or formed of metal, polished to avoid scratching or marring of the frames when the attachments are engaged therewith or disengaged therefrom, and the metal from which the clips are formed is sufficiently resistant to fatigue during or as a result of flexing that the clips will be resistant to breaking during ordinary use, while being sufficiently intrinsically resilient to assure a satisfactory tight and secure engagement of the clip with the frame. A high-grade brass that has been carefully tempered is a satisfactory metal for this use, and, if desired, merely the clip elements may be tempered without tempering the remainder of the arcuate elements of which the clips are integrally formed.

It will be understood, in the foregoing description of the subject matter of this invention wherein particular references are made to the figures of the drawing wherein certain specific embodiments of the invention are illustrated, that the ornamental configurations shown are provided by way of representation merely, and are not to be construed as being any structural features of the invention here claimed.

This application is a continuation-in-part of copending application Serial Number 427,563, filed May 4, 1954, by the same inventor and entitled: Ornamental Attachments for Eyeglass Frames, now abandoned.

Having thus described the subject matter of this invention, what it is desired to secure by Letters Patent of the United States is:

An ornamental attachment for eyeglass frames, easily manually engageable with and disengageable from such engagement with ordinary types of eyeglass frames without structural modification of the frames for this purpose, that comprises an initially separate composite front assembly comprised of a plurality of ornamental elements and a relatively fragile mounting for supporting said ornamental elements in a generally arcuate display relationship; a substantially flat, similarly generally arcuate, relatively rugged rear supporting element; fastening means substantially permanently attaching said front assembly to said rear supporting element whereby substantial structural rigidity, strength, and resistance to bending are imparted to the integrated unit; said rear supporting element being provided with a plurality of integrally formed, resiliently tensioned, U-shaped clip elements facing in a common direction and adapted to being received upon marginal portions of eyeglass frames peripheral to a lens in the frames for detachably mounting the attachment upon said frames.

References Cited in the file of this patent

UNITED STATES PATENTS

| 2,538,692 | Lindblom | Jan. 16, 1951 |
|---|---|---|
| 2,599,463 | Lamb | June 3, 1952 |
| 2,627,782 | May | Feb. 10, 1953 |